United States Patent
Ugono et al.

(10) Patent No.: US 11,820,938 B1
(45) Date of Patent: Nov. 21, 2023

(54) FORMULATIONS FOR DISPERSAL OF BYPRODUCTS OF OIL FIELD SCAVENGER SLURRIES AND ASPHALTENE DEPOSITS

(71) Applicant: Baker Hughes Oilfield Operations LLC, Houston, TX (US)

(72) Inventors: Onome Ugono, Rosenberg, TX (US); Sankaran Murugesan, Katy, TX (US); Jerry J. Weers, Richmond, TX (US); Kekeli A. Ekoue-Kovi, Rosenberg, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/877,968

(22) Filed: Jul. 31, 2022

(51) Int. Cl.
C09K 8/524 (2006.01)

(52) U.S. Cl.
CPC .................................. C09K 8/524 (2013.01)

(58) Field of Classification Search
None
See application file for complete search history.

(56) References Cited

U.S. PATENT DOCUMENTS

| | | | | |
|---|---|---|---|---|
| 2,587,643 A * | 3/1952 | Myers | ................... | C10G 21/003 208/309 |
| 4,191,639 A * | 3/1980 | Audeh | ............... | B01D 11/0407 208/309 |
| 9,169,446 B2 | 10/2015 | Yusuf et al. | | |
| 10,711,175 B2 | 7/2020 | Akaighe et al. | | |
| 2013/0220883 A1* | 8/2013 | Mazyar | ................... | C10G 1/045 208/44 |
| 2013/0252858 A1* | 9/2013 | Plishka | .................... | C09K 8/68 507/261 |
| 2015/0225654 A1* | 8/2015 | Yang | ..................... | C10G 33/04 516/30 |
| 2016/0145487 A1* | 5/2016 | Alam | ....................... | C09K 8/64 507/252 |
| 2021/0155843 A1 | 5/2021 | Gul et al. | | |
| 2021/0179925 A1 | 6/2021 | Farmer et al. | | |
| 2021/0340426 A1* | 11/2021 | Koster | ................. | C09K 8/5751 |

FOREIGN PATENT DOCUMENTS

| | | |
|---|---|---|
| WO | 2013112679 A1 | 8/2013 |
| WO | 2021212051 A1 | 10/2021 |

OTHER PUBLICATIONS

Gharbi, Kheira, et al., "Removal and prevention of asphaltene deposition during oil production: A literature review", Journal of Petroleum Scient and Engineering 158; Mar. 2017; 315-360.
Abouie, Ali, et al., "Modeling and Simulation of Asphaltene Inhibition and Using Aromatic Solvents", SPE-200842; Apr. 2021, 2 pages.

* cited by examiner

Primary Examiner — Andrew Sue-Ako
(74) Attorney, Agent, or Firm — Crowe & Dunlevy, P.C.

(57) ABSTRACT

Dispersants including at least one organic carbonate can keep deposits dispersed within hydrocarbons, where the solids are asphaltenes and derivatives from triazine-based $H_2S$ scavengers.

17 Claims, 9 Drawing Sheets

10 grams TI after mixing with 0.5 g Triazine sludge & Heating @ 70 C for 20 hrs + 10 g TI Ex. 19

10 grams PC/TI 1:1 after mixing with 0.5 g Triazine sludge & heating @ 70 C for 20 hrs Ex. 20

10 grams EC/TI 1:1 after mixing with 0.5 g Triazine sludge & heating @ 70 C for 20 hrs Ex. 21

10 grams PC/TI/Cl2 1:1:1 after mixing with 0.5 g Triazine sludge & heating @ 70 C for 20 hrs Ex. 22

10 grams PC/TI 1:1 before mixing with 0.5 g Triazine sludge 10 grams PC/TI 1:1 after mixing with 0.5 g Triazine sludge 10 grams PC/TI 1:1 after mixing with 0.5 g Triazine sludge & heating @ 70 C for 20 hrs 10 grams EC/TI 1:1 before mixing with 0.5 g Triazine sludge 10 grams EC/TI 1:1 after mixing with 0.5 g Triazine sludge 10 grams EC/TI 1:1 after mixing with 0.5 g Triazine sludge & heating @ 70 C for 20 hrs

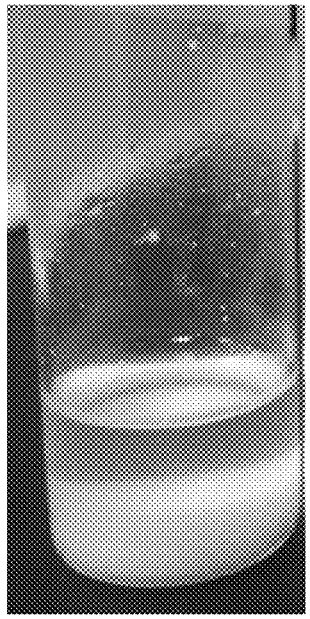
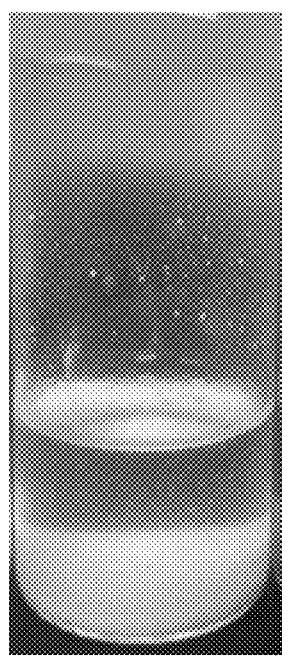
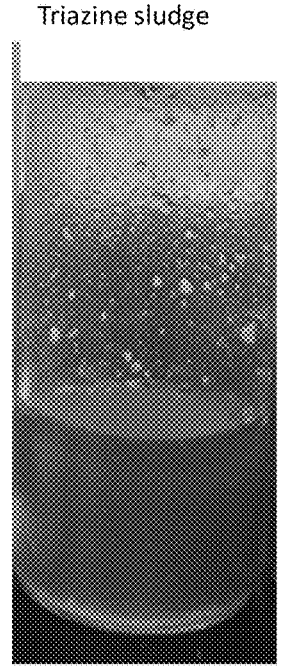
10 grams EC mixed with 0.5 g Triazine sludge
10 grams EC/Cl1 1:1 mixed with 0.5 g Triazine sludge
10 grams PC mixed with 0.5 g Triazine sludge
10 grams PC/Cl1 1:1 mixed with 0.5 g Triazine sludge
FIG. 3A  FIG. 3B  FIG. 3C  FIG. 3D

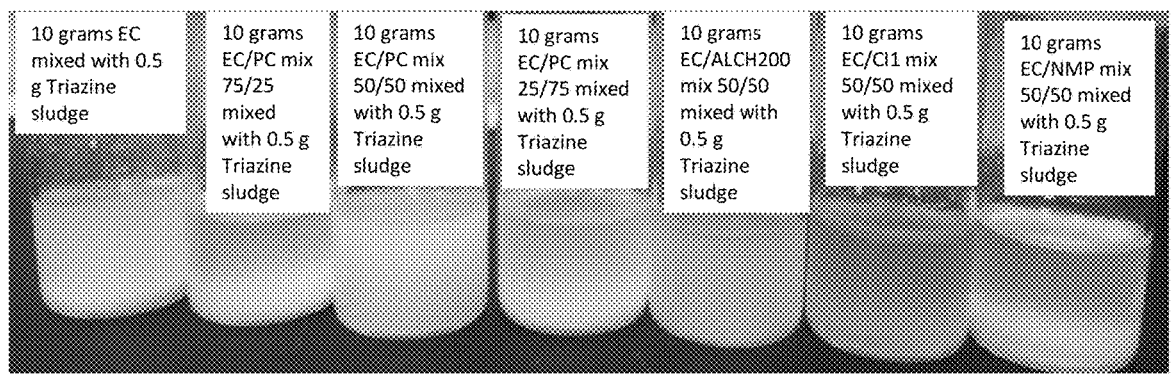
FIG. 5A – Before Heating 4 Hours at 70°C
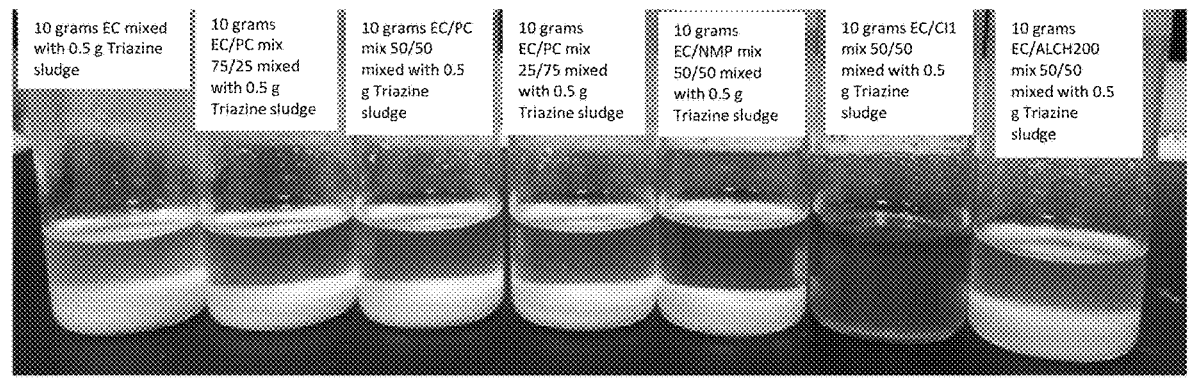
FIG. 5B – After Heating 4 Hours at 70°C

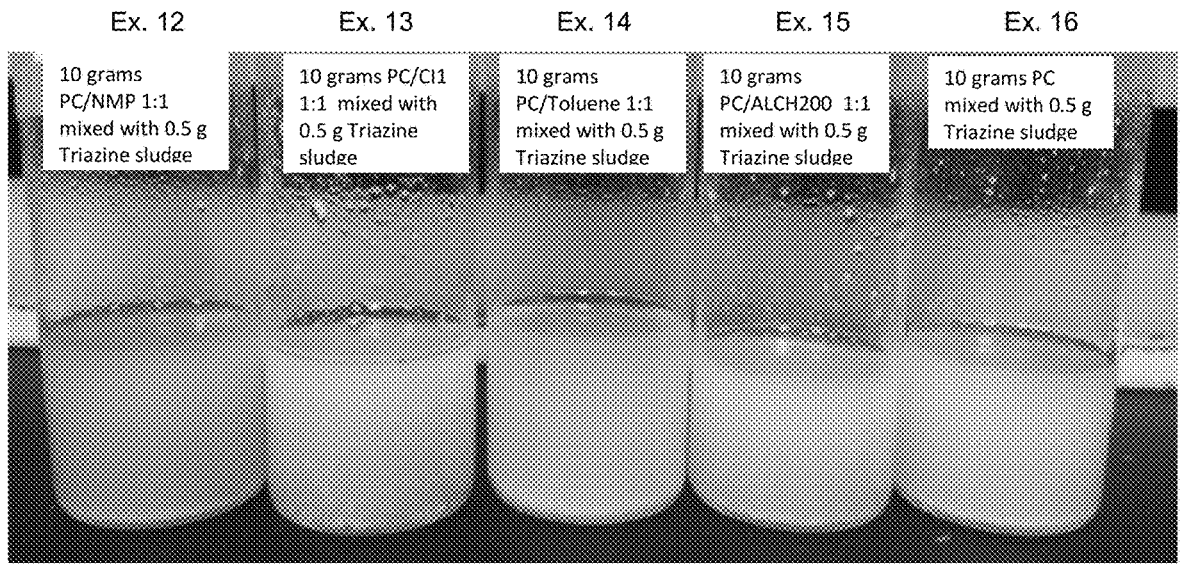
FIG. 6A – Before Heating 4 Hours at 70°C
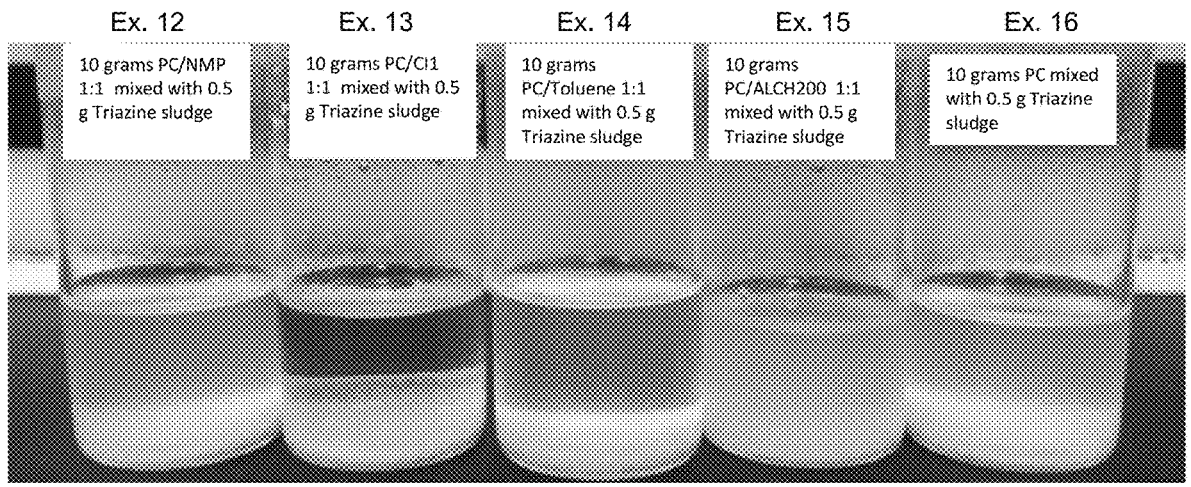
FIG. 6B – After Heating 4 Hours at 70°C 9 grams PC/ 0.5 grams elemental S/ after Heating @ 70 C for 20 hrs 9 grams EC/ 0.5 grams elemental S/ after Heating @ 70 C for 20 hrs 9 grams PC/ 0.5 grams elemental S/ 0.5 grams Triazine sludge & Heating @ 70 C for 20 hrs

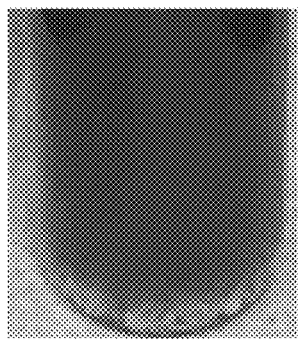
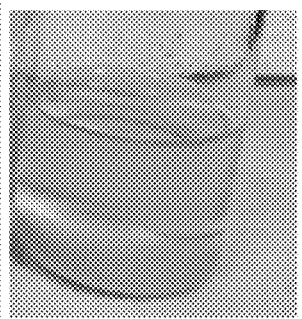
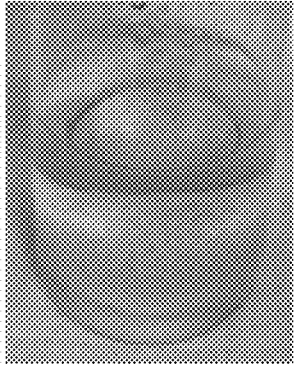
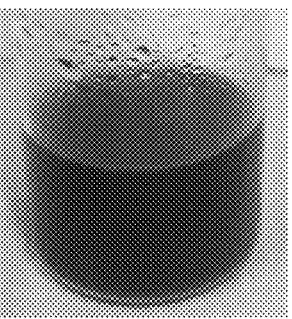
FIG. 9A
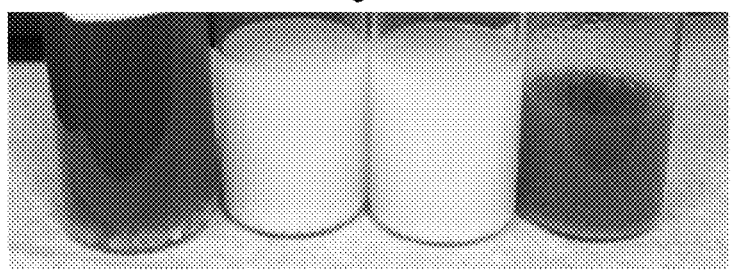
FIG. 9B
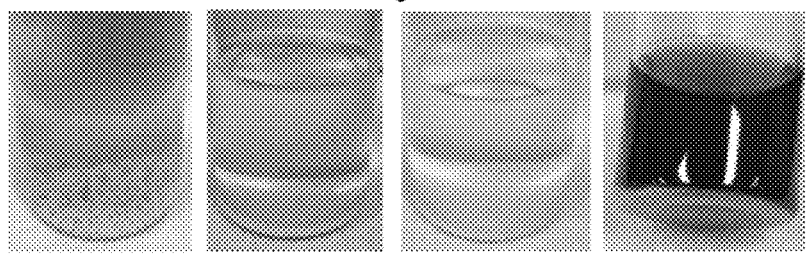
FIG. 9C

US 11,820,938 B1

FORMULATIONS FOR DISPERSAL OF BYPRODUCTS OF OIL FIELD SCAVENGER SLURRIES AND ASPHALTENE DEPOSITS

TECHNICAL FIELD

The present invention relates to methods and compositions for keeping species dispersed within hydrocarbons, and more particularly relates to methods and compositions for dispersing asphaltenes and solids or slurries derived from triazine-based $H_2S$ scavengers within hydrocarbons.

BACKGROUND

Crude oils and other heavier petroleum fractions often contain organic materials such as asphaltenes. Asphaltene deposits in the wellbore cause problems and must be removed. Asphaltenes are organic materials consisting of aromatic and naphthenic ring compounds containing nitrogen, sulfur and oxygen molecules. The asphaltene fraction of crude may be defined as the organic part of the oil that is not soluble in straight-chain solvents such as pentane or heptane. Asphaltenes may exist as a colloidal suspension stabilized by resin molecules (e.g., aromatic ring systems) in the oil. The asphaltenes may precipitate as a result of a number of effects or factors including, but not necessarily limited to, pressure drop, shear forces (turbulent flow), acids, solution carbon dioxide ($CO_2$), mixing of incompatible crude oils, injected condensate, or other conditions or materials that break or disturb the stability of the asphaltic dispersion. Asphaltene deposits may occur in the near-wellbore region of a subterranean formation, well production tubing, valves and chokes, flowlines, risers, surface treating vessels, and storage tanks.

Besides these asphaltene deposits, solids and slurries originating from triazine-based hydrogen sulfide ($H_2S$) scavengers can also cause problems. These are typically by-products of the scavenging activity of triazine-based additives. Triazine-based $H_2S$ scavengers are introduced downhole and in other places where produced hydrocarbons are present to inhibit or prevent the evolution of $H_2S$. Hydrogen sulfide is a poisonous gas which can be lethal at high concentrations. The $H_2S$ scavengers react with and bind up the $H_2S$ to form reaction products or derivatives, which in turn can form the problematic solids or slurries.

While methods are known for removing these deposits from places on equipment, flowlines, and the like, upon which they deposit, it is much more desirable to keep them from depositing in the first place because removal methods typically require the application of physical techniques and/or the introduction of large amounts of removal chemical.

It is thus a continuing goal to keep certain species dispersed within a hydrocarbon, such as crude oil, to avoid them forming problematic deposits.

SUMMARY

There is provided, in one non-limiting embodiment, a method for dispersing deposits in hydrocarbons, the method comprising introducing into a hydrocarbon containing such deposits, which deposits are selected from the group consisting of asphaltenes and derivatives from triazine-based $H_2S$ scavengers, an effective amount of a dispersant to disperse the deposits in the hydrocarbon. The dispersant includes at least one organic carbonate alone or together with optional additives. The method also includes mixing the dispersant into the hydrocarbon.

BRIEF DESCRIPTION OF THE DRAWINGS

FIG. 3A is a photograph of a glass bottle containing 10 grams of EC mixed with 0.5 grams of triazine sludge;

FIG. 3B is a photograph of the glass bottle of FIG. 3A containing 10 grams of a 1:1 volume ratio EC and CI1 (Corrosion Inhibitor 1) mixed with 0.5 grams of triazine sludge;

FIG. 3C is a photograph of a glass bottle containing 10 grams of PC mixed with 0.5 grams of triazine sludge;

FIG. 3D is a photograph of the glass bottle of FIG. 3C containing 10 grams of a 1:1 volume ratio PC and CI1 mixed with 0.5 grams of triazine sludge;

FIG. 5A is a photograph of the seven glass bottles of Examples 5-11 before heating;

FIG. 5B is a photograph of the seven glass bottles of Examples 5-11 in FIG. 5A after heating at 70° C. for 20 hours;

FIG. 6A is a photograph of the five glass bottles of Examples 12-16 before heating;

FIG. 6B is a photograph of the five glass bottles of Examples 12-16 in FIG. 6A after heating at 70° C. for 20 hours;

FIG. 9A is a photograph of four glass bottles of Examples 19-22 before the addition of more TI and storage;

FIG. 9B is a photograph of the four glass bottles of FIG. 9A after the addition of 5 more grams of TI and after 20 hours of storage at 70° C.;

FIG. 9C is a photograph of the four glass bottles of FIG. 9B after an additional 20 hours of storage at 70° C.;

DETAILED DESCRIPTION

Figure 1A:
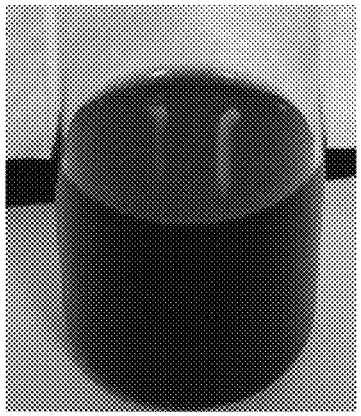
FIG. 1A is a photograph of a glass bottle containing 10 grams of propylene carbonate (PC) and tincture of iodine (TI) in a 1:1 volume ratio before mixing with any triazine sludge.

It has been discovered that organic carbonates are effective in keeping deposits such as asphaltenes and/or triazine-based H₂S scavengers dispersed within the hydrocarbons containing them. Typically, the hydrocarbons of most concern are those produced from a subterranean formation, such as crude oils, because crude oils are the hydrocarbons most commonly treated with triazine-based H₂S scavengers and most likely to contain asphaltenes. It has also been discovered that derivatives of the organic carbonates described herein may be used as paraffin inhibitors which facilitate pour point depression.

In one non-limiting embodiment, it will be appreciated that the asphaltenes and slurries and/or solids from triazine-based H₂S scavengers are more precisely termed "deposit-forming materials" since they may or may not be in solid form when they are present in the hydrocarbon stream. If they are in solid form, they may already be dispersed or suspended to some extent. These deposit-forming materials derived from triazine-based H₂S scavengers are also referred to herein more informally as "sludges".

It should be noted that the method is considered successful if the deposit-forming materials continue to be dispersed within the hydrocarbon to a greater extent than if the organic carbonate was not introduced. The method does not contemplate removing the deposit-forming materials from the hydrocarbon stream; the goal is to keep the materials dispersed so that the stream will continue flowing and not drop out or precipitate deposits. The hydrocarbon stream can be treated with an organic carbonate before conditions occur that may cause precipitation or deposition of solids. Such conditions include, but are not necessarily limited to, a pressure drop, shear forces (turbulent flow), presence of acids, presence of solution carbon dioxide (CO₂), mixing of incompatible crude oils, injection of condensate, or other conditions or materials that break or disturb the stability of the solids-forming materials dispersion.

Triazine-based additives that may cause the existence of solids-forming byproducts include dithiazine, thiadiazine, and trithiane derivatives. S-Triazine has the structure (I):

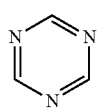
(I)

Triazine derivatives have substituents on one or more of the nitrogens. A common H₂S scavenger is MEA-triazine, where MEA refers to monoethanol amine. MEA-triazine has the structure (II):

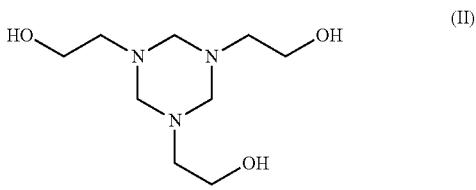 [SMILES: OCCN1CN(CCO)CN(CCO)C1]
(II)

Derivatives of MEA-triazine have one or more of the nitrogen atoms substituted with sulfur atoms, as in structures (III) and (IV):

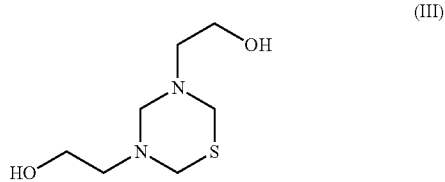
(III)

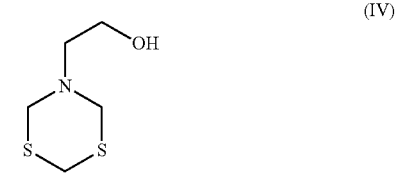
(IV)

Other triazine derivatives include, but are not necessarily limited to, trithiane (structure (V)), thiadiazines (structure (VI)), and dithiazines (structure (VII)):

(V)

(VI)

(VII)

Structures (VII) are dithiazine derivatives.

The organic carbonates suitable for use in the dispersants of the method described herein include those which are derived from carbon dioxide (CO₂) and which are biodegradable. In one non-limiting embodiment, suitable organic carbonates include, but are not limited to, ethylene carbonate, propylene carbonate, glycerol carbonate, styrene carbonate, dimethyl carbonate, diethyl carbonate, dibutyl carbonate, dodecyl carbonate, and combinations thereof.

In another non-limiting embodiment, the effective amount of the at least one organic carbonate present in the hydrocarbon being treated ranges from about 100 ppm independently to about 10 volume %; alternatively, from about 500 ppm independently to about 50,000 ppm; and in another non-restrictive version, from about 1000 ppm independently to about 10,000 ppm, based on the hydrocarbon. As used herein with respect to a range, "independently" means that any threshold may be used together with any other threshold to give a suitable alternative range.

In one non-limiting embodiment, the method of dispersing deposits in hydrocarbons is facilitated by heating the hydrocarbons. In a non-restrictive version the heating may be from about 35° C. independently to about 250° C.; in another non-limiting embodiment, from about 50° C. independently to about 150° C.; alternatively, from about 70° C. independently to about 125° C. While the length of time that the heating takes place is not critical, in one non-limiting embodiment it may be at least 4 hours; alternatively, at least 20 hours; in another non-restrictive version at least 40 hours; and in a different non-limiting embodiment at least 1 hour. The need for heating depends on the oligomeric nature of the sludge.

The dispersant may have one or more optional components including, but not necessarily limited to, at least one solvent, at least one surfactant, at least one glycol ether, at least one organic acid, at least one ester, and combinations thereof. It should be noted that a non-limiting goal is to maximize the amount of biodegradable (so-called "green") components in the dispersant formulation.

Suitable solvents include, but are not necessarily limited to, aromatic naphtha, toluene, xylene, cyclohexane, pentane, heptane, glycol and alcohol ethers, and combinations of these.

Suitable surfactants include, but are not necessarily limited to, alcohol oxyalkylates, nonylphenol oxyalkylates, sorbitol oxyalkylates, polyglycol ethers, polyamine oxyalkylates, and combinations thereof.

Suitable glycol ethers include, but are not necessarily limited to, 2-butoxyethanol, propylene glycol methyl ether, hexylene glycol, propylene glycol acetate, ethylene glycol, dipropylene glycol, propylene glycol, and combinations thereof.

Suitable organic acids include, but are not necessarily limited to, formic acid, acetic acid, citric acid, adipic acid, methoxy propionic acid, succinic acid, ascorbic acid, erythorbic acid, malic acid, muconic acid, mucic acid, and combinations thereof.

Suitable esters include, but are not necessarily limited to, ethyl acetate, propylene glycol acetate, dimethyl glutarate, dimethyl adipate, dimethyl succinate, and combinations thereof.

Suitable proportion ranges are given in Table I. Again, for any given component, any endpoint may be combined with any other endpoint to give a suitable alternative range.

TABLE I

Suitable Dispersant Component Proportion Ranges

| Component | First Embodiment Volume % | Second Embodiment Volume % |
| --- | --- | --- |
| Organic carbonate | 25-100 | 25-30 |
| Aromatic solvent | 0-25 | 10-25 |
| Surfactants | 0-10 | 0-5 |
| Glycol Ethers | 0-20 | 15-20 |
| Organic Acids | 0-2 | 1-2 |
| Esters | 0-30 | 15-20 |

The dispersants described herein offer a route to at least partially solubilize and disperse the deposit-forming materials in the hydrocarbon. It is expected that in all cases after the dispersant is introduced that there will be some mixing of the dispersant within the hydrocarbon so that it can effectively act throughout at least most (50 volume % or more) of the hydrocarbon. These dispersants will help mitigate or prevent fouling and the potential loss of equipment efficiency due to the presence of the deposits.

The invention will be further described with respect to the following Examples, which are not meant to limit the invention, but rather to further illustrate some embodiments.

EXAMPLES

Examples 1-22 present photographs of studies on dithiazine residue solubility.

Example 1

FIG. 1A is a photograph of a glass bottle containing 10 grams of propylene carbonate (PC) and tincture of iodine (TI) in a 1:1 volume ratio before mixing with any triazine sludge. Unless otherwise noted, in all Examples the TI was formulated using 2 grams of iodine and 2.3 grams of sodium iodide (NaI) in 50 milliliters (ml) of ethanol, which was then diluted to a total of 100 ml with water. The iodine will cleave S—S bonds in the dithiazine residue. The color disappears as $I_2$ is consumed, which suggests that the —S—S— bonds are present in the sample.

Figure 1B:
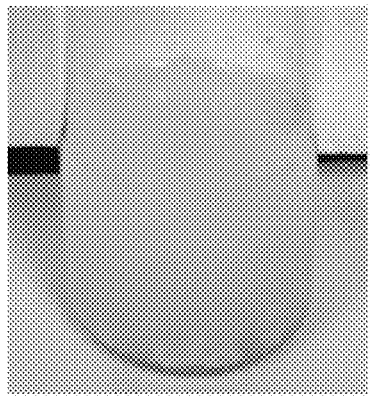
FIG. 1B is a photograph of the glass bottle of FIG. 1A after mixing with 0.5 g of a triazine sludge.

FIG. 1B is a photograph of the glass bottle of FIG. 1A after mixing with 0.5 g of a triazine sludge. It may be seen that the iodine color is almost completely gone, indicating that any —S—S— bonds present in the triazine sludge were cleaved.

Figure 1C:
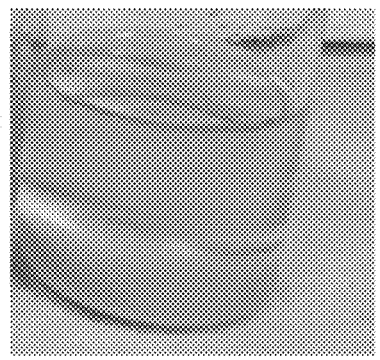
FIG. 1C is a photograph of the glass bottle of FIG. 1B after heating at 70° C. (158° F.) for 20 hours.

FIG. 1C is a photograph of the glass bottle of FIG. 1B after heating at 70° C. for 20 hours. A slight iodine color is present. It may be seen that a material has precipitated and that the material has a powdery appearance; the material was not completely dispersed.

Example 2

Figure 2A:
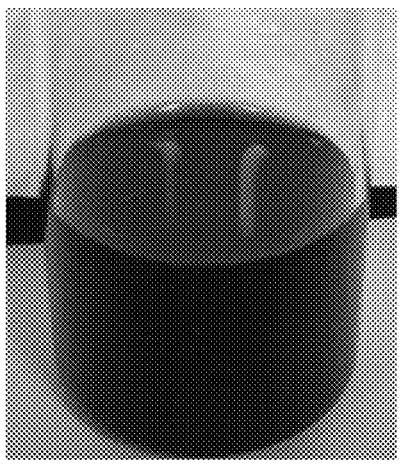
FIG. 2A is a photograph of a glass bottle containing 10 grams of ethylene carbonate (EC) and TI in a 1:1 volume ratio before mixing with any triazine sludge.
Figure 2B:
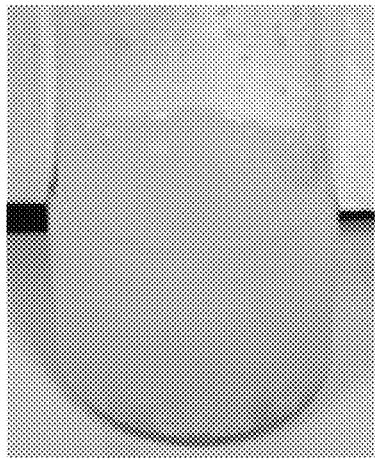
FIG. 2B is a photograph of the glass bottle of FIG. 2A after mixing with 0.5 g of a triazine sludge.
Figure 2C:
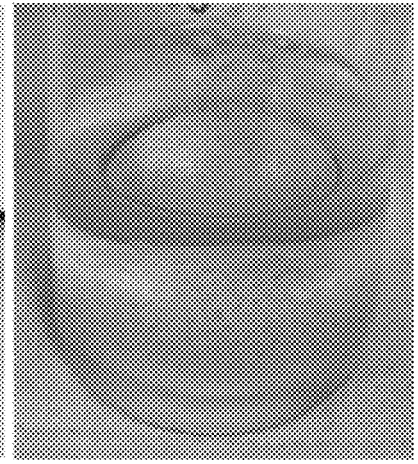
FIG. 2C is a photograph of the glass bottle of FIG. 2B after heating at 70° C. for 20 hours.

FIG. 2A is a photograph of a glass bottle containing 10 grams of ethylene carbonate (EC) and TI in a 1:1 volume ratio before mixing with any triazine sludge. Shown in FIG. 2B is a photograph of the glass bottle of FIG. 2A after mixing with 0.5 g of a triazine sludge. The same triazine sludge was used in all the Examples except for Examples 23 of FIG. 10 where asphaltenes were being dispersed. As with FIG. 1B, the iodine color is almost entirely gone. FIG. 2C is a photograph of the glass bottle of FIG. 2B after heating at 70° C. for 20 hours. A slight iodine color remains. It may be seen that a material has precipitated and that the material was not as powdery in appearance as that of FIG. 1C; the material was not completely dispersed.

Example 3

Shown in FIG. 3A is a photograph of a glass bottle containing 10 grams of EC mixed with 0.5 grams of triazine sludge.

FIG. 3B is a photograph of the glass bottle of FIG. 3A containing 10 grams of a 1:1 volume ratio EC and CI1 (Corrosion Inhibitor 1, which is a triazine-based corrosion inhibitor) mixed with 0.5 grams of triazine sludge.

FIG. 3C is a photograph of a glass bottle containing 10 grams of PC mixed with 0.5 grams of triazine sludge.

FIG. 3D is a photograph of the glass bottle of FIG. 3C containing 10 grams of a 1:1 volume ratio PC and CI1 mixed with 0.5 grams of triazine sludge.

It may be seen that a material has precipitated in all of the bottles shown in FIGS. 3A-3D. However, the addition of CI1 to the triazine sludge reduces the volume of the precipitated material, and the additive turns the liquid a red color.

Example 4

Figure 4A:
FIG. 4A is a photograph of a glass bottle containing 10 grams of PC and TI and CI1 in a 1:1:1 volume ratio before mixing with any triazine sludge.
Figure 4B:
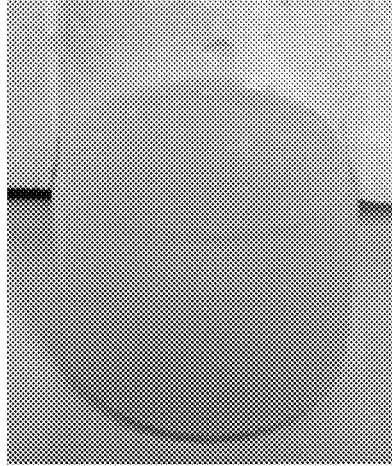
FIG. 4B is a photograph of the glass bottle of FIG. 4A after mixing with 0.5 g triazine sludge.
Figure 4C:
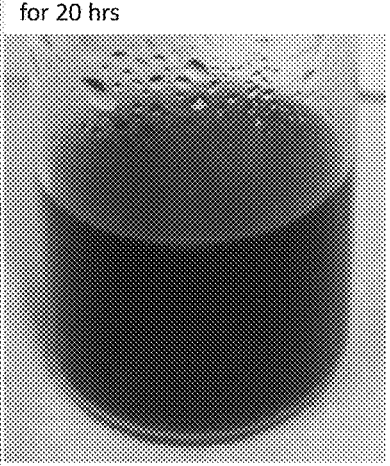
FIG. 4C is a photograph of the glass bottle of FIG. 4B after heating at 70° C. for 20 hours.

Shown in FIG. 4A is a photograph of a glass bottle containing 10 grams of PC and TI and CI1 in a 1:1:1 volume ratio before mixing with any triazine sludge. It is noted that the liquid does not have a strong iodine color as in FIGS. 1A and 2A. FIG. 4B is a photograph of the glass bottle of FIG. 4A after mixing with 0.5 g triazine sludge. FIG. 4C is a photograph of the glass bottle of FIG. 4B after heating at 70° C. for 20 hours. The liquid has become a red color as in FIGS. 3B and 3C which also contain corrosion inhibitors CI1 and CI2(CI2). It can be seen that there is a very small layer of powdery material in the bottom of the bottle; thus, CI1 and CI2 (Triazine Corrosion Inhibitor 2 i.e., CI2) shows dispersion of the triazine sludge.

Examples 5-11

Shown in FIG. 5A is a photograph of the seven glass bottles of Examples 5-11 before heating. TI was not included in these formulations. The Examples have the following compositions.
  Example 5: 10 grams of EC mixed with 0.5 grams of triazine sludge.
  Example 6: 10 grams of a mixture of EC/PC in a 75/25 vol ratio with 0.5 grams of triazine sludge.
  Example 7: 10 grams of a mixture of EC/PC in a 50/50 vol ratio with 0.5 grams of triazine sludge.
  Example 8: 10 grams of a mixture of EC/PC in a 25/75 vol ratio with 0.5 grams of triazine sludge.
  Example 9: 10 grams of a mixture of EC/ALCH200 in a 50/50 vol ratio with 0.5 grams of triazine sludge. ALCH200 is a metal removal chemistry that is a mixture of carboxylic acids.
  Example 10: 10 grams of a mixture of EC/CI1 (Triazine Corrosion Inhibitor 1, i.e., CI1) in a 50/50 vol ratio with 0.5 grams of triazine sludge.
  Example 11: 10 grams of a mixture of EC/NMP in a 50/50 volume ratio with 0.5 grams of triazine sludge. NMP refers to N-methylpyrrolidinone.

FIG. 5B is a photograph of the seven glass bottles of Examples 5-11 in FIG. 5A after heating at 70° C. for 20 hours. It may be seen that for most Examples the triazine sludge is dispersed. The formulation of Ex. 10 in FIG. 5B with CI1 has the red color of FIGS. 3B and 3D, and is also the cloudiest of the bottles in FIG. 5B, which indicates the dispersion of triazine sludge for Examples 5, 6, 7, 8, 9, and 11.

Examples 12-16

Shown in FIG. 6A is a photograph of the five glass bottles of Examples 12-16 before heating. TI was not included in these formulations. The Examples have the following compositions.
  Example 12: 10 grams of PC/NMP in a 1:1 volume ratio mixed with 0.5 g of triazine sludge.
  Example 13: 10 grams of PC/CI1CI2 (CI2) in a 1:1 volume ratio mixed with 0.5 g of triazine sludge.
  Example 14: 10 grams of PC/toluene in a 1:1 volume ratio mixed with 0.5 g of triazine sludge.
  Example 15: 10 grams of PC/ALCH200 (metal removal chemistry) in a 1:1 ratio mixed with 0.5 g of triazine sludge.
  Example 16: 10 grams of PC mixed with 0.5 g of triazine sludge.

FIG. 6B is a photograph of the five glass bottles of Examples 12-16 in FIG. 6A after heating at 70° C. for 20 hours. It may be seen that for all Examples the triazine sludge is more dispersed in FIG. 6B as compared to FIG. 6A, although not all to the same extent, which indicates dispersion of triazine sludge for these Examples.

Example 17

Figures 7A, 7B, 7C:
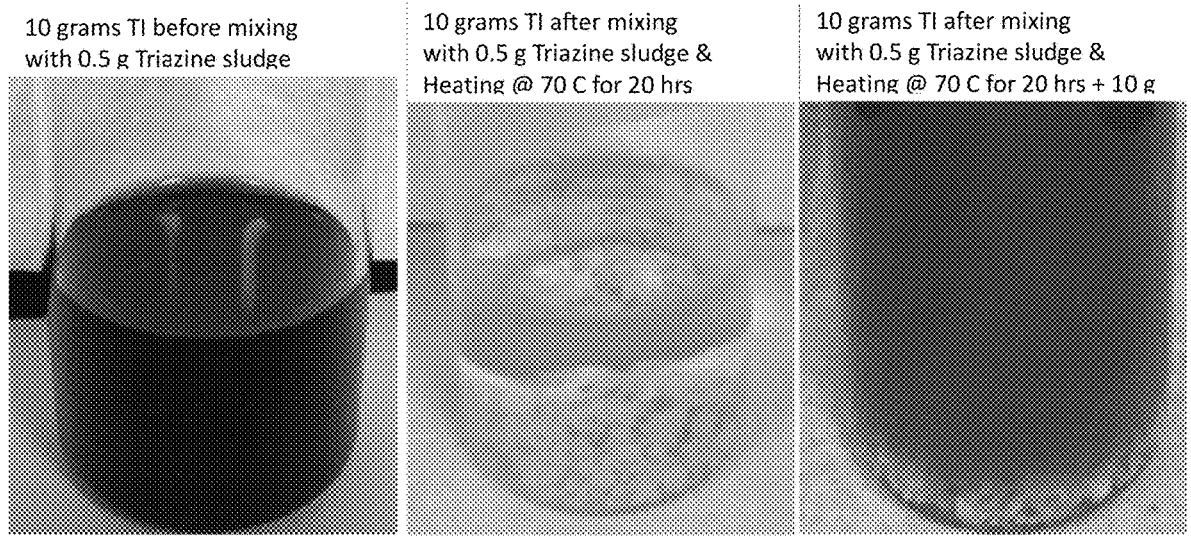
FIG. 7A is a photograph of a glass bottle containing 10 grams of TI before mixing with triazine sludge.
FIG. 7B is a photograph of the glass bottle of FIG. 7A after mixing with 0.5 g of triazine sludge and heating at 70° C. for 20 hours.
FIG. 7C is a photograph of the glass bottle of FIG. 7B after mixing after addition of another 10 grams of TI.

Shown in FIG. 7A is a photograph of a glass bottle containing 10 grams of TI before mixing with triazine sludge. FIG. 7B is a photograph of the glass bottle of FIG. 7A after mixing with 0.5 g of triazine sludge and heating at 70° C. for 20 hours. FIG. 7C is a photograph of the glass bottle of FIG. 7B after mixing after addition of another 10 grams of TI. The iodine color in the bottles disappears on shaking the samples before the heating period. It may be seen that there is some precipitated material in the bottom of the bottle for both FIGS. 7B and 7C.

Example 18

Figure 8A:
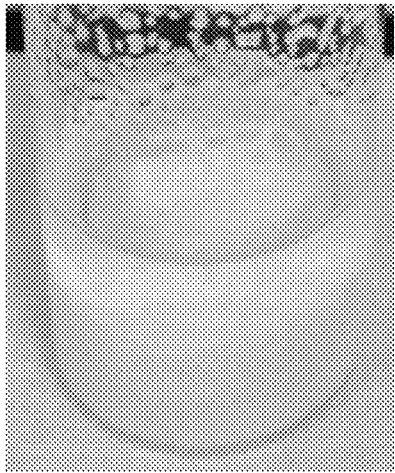
FIG. 8A is a photograph of a glass bottle containing 9 grams of PC and 0.5 grams of elemental sulfur after heating at 70° C. for 20 hours.
Figure 8B:
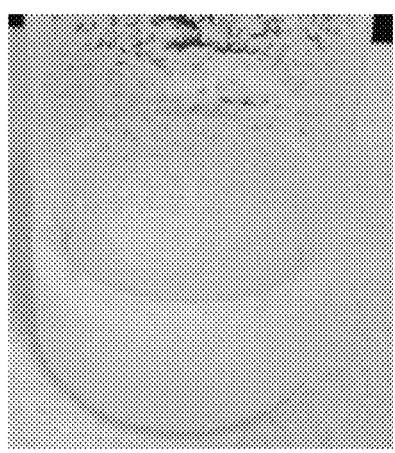
FIG. 8B is a photograph of the glass bottle of FIG. 8A containing 9 grams of EC and 0.5 grams of elemental sulfur after heating at 70° C. for 20 hours.
Figure 8C:
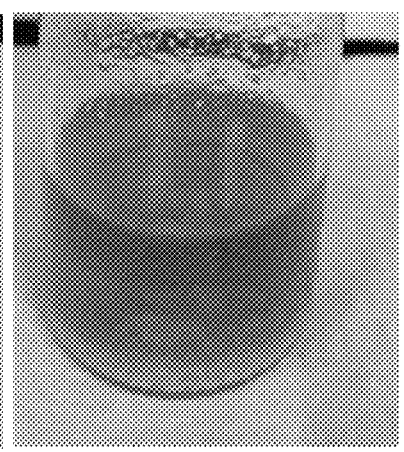
FIG. 8C is a photograph of the glass bottle of FIG. 8B after the addition of 0.5 grams of triazine sludge and further heating at 70° C. for 20 hours.

FIG. 8A is a photograph of a glass bottle containing 9 grams of PC and 0.5 grams of elemental sulfur after heating at 70° C. for 20 hours. FIG. 8B is a photograph of the glass bottle of FIG. 8A containing 9 grams of EC and 0.5 grams of elemental sulfur after heating at 70° C. for 20 hours. FIG. 8C is a photograph of the glass bottle of FIG. 8B after the addition of 0.5 grams of triazine sludge.

FIGS. 8A and 8A show a cloudy, light-yellow solution. FIG. 8C shows an orange-colored, generally transparent solution with precipitated material.

Examples 19-22

Shown in FIG. 9A is a photograph of four glass bottles of Examples 19-22 before the addition more TI and heated storage. The Example formulations had the following compositions.
  Example 19: 10 grams of TI after mixing with 0.5 grams of triazine sludge and heating at 70° C. for 20 hours and adding 10 more grams of TI.
  Example 20: 10 grams of PC/TI in a 1:1 volume ratio after mixing with 0.5 grams of triazine sludge and heating at 70° C. for 20 hours.
  Example 21: 10 grams of EC/TI in a 1:1 volume ratio after mixing with 0.5 grams of triazine sludge and heating at 70° C. for 20 hours.
  Example 22: 10 grams of PC/TI/CI2 in a 1:1:1 volume ratio after mixing with 0.5 grams of triazine sludge and heating at 70° C. for 20 hours.

For Examples 19-22, 15 grams of TI added to the samples=(15×0.02)/254 g 12/moles=0.0012 moles of $I_2$. Assuming a 1:1 iodine stoichiometry with the triazine sludge, thus the molecular weight of the sludge is at least 0.5 grams/0.0012 moles=417 grams/mole.

FIG. 9B is a photograph of the four glass bottles of FIG. 9A after the addition of 5 more grams of TI and after 20 hours of storage at 70° C. FIG. 9C is a photograph of the four glass bottles of FIG. 9B after an additional 20 hours of storage at 70° C. It may be seen that Example 19 having the most TI had a strong iodine color in FIGS. 5A and 5B, but which had largely disappeared in FIG. 9C. Examples 20 and 21 and much less iodine color. Example 22 had a deep red color due to the CI1CI2. The contents of the bottles in FIG. 9B all had a cloudy appearance and precipitated material, but in FIG. 9C, Example 19 was only slightly cloudy while Examples 20-22 were transparent. Each bottle in FIG. 9C had some precipitated material. The material in Example 22 was largely dispersed with very little precipitation.

Example 23

Figure 10:
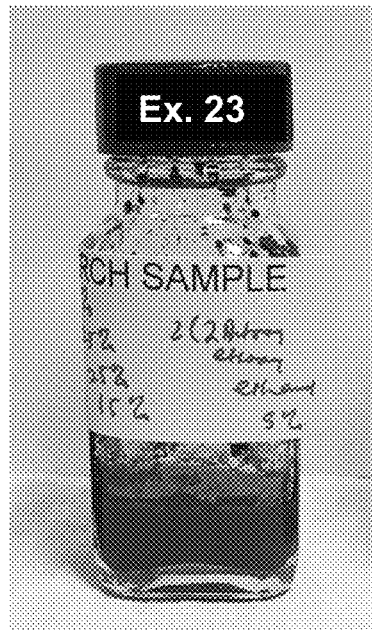
FIG. 10 is a photograph of a glass bottle for Example 23.

Shown FIG. 10 is a photograph of a glass bottle for Example 23 demonstrating the dispersion of asphaltenes using various compositions. The compositions are noted below.
Example 23: 30 vol % PC, 25 vol % EOAc (ethyl acetate), 25 vol % xylenes; 15 vol % 2-butoxyethanol, and 5 vol % 2(2-butoxyethoxy)ethanol.
FIG. 10 demonstrated good properties in the dispersal of asphaltenes.

Examples 24-26

Figure 11:
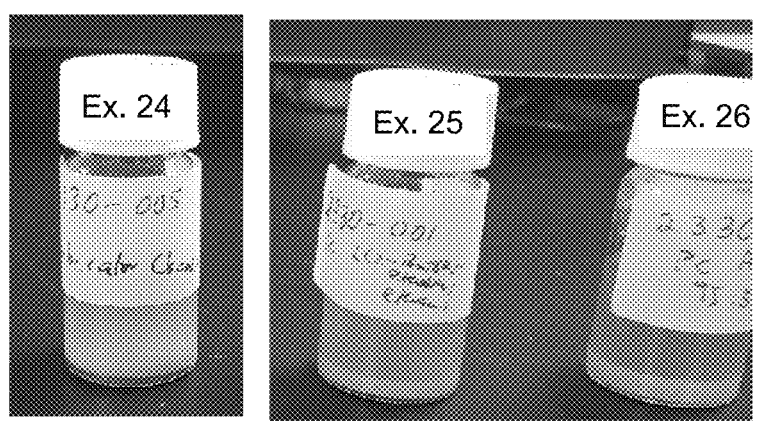
FIG. 11 is a photograph of three glass bottles for Examples 24-26.

Shown in FIG. 11 is a photograph of four glass bottles for Examples 24-26. These Examples demonstrate the dissolution and dispersion of solid deposits, namely triazine sludge byproduct slurries. For increased amounts of slurry, i.e., gram quantities can be dispersed using a number of the compositions. The compositions are noted below.
Example 24: Same composition as Example 23.
Example 25: 75% vol PC 25 vol % 2(2-butoxyethyoxy) ethanol.
Example 26: PC 95%+acetone 5%.
FIG. 11 showed some PC derived formulations in dispersing the triazine sludge as compared to water. Examples 24 and 25 demonstrated an ability to appreciably suspend or make the solids somewhat finer and thus readily flowable.

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, different organic carbonate, hydrocarbons, deposits, triazine sludges, surfactants, aromatic solvents, glycol ethers, organic acids, esters, proportions, dosages, temperatures, heating times, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. For instance, there is provided a method for dispersing deposits in hydrocarbons, where the method comprises, consists essentially of, or consists of, introducing into a hydrocarbon containing deposits which are selected from the group consisting of asphaltenes and derivatives from triazine-based $H_2S$ scavengers, an effective amount of a dispersant to disperse the deposits in the hydrocarbon, where the dispersant comprises at least one organic carbonate, and then mixing the dispersant into the hydrocarbon.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for dispersing deposits in hydrocarbons, the method comprising:
   introducing into a hydrocarbon, where the hydrocarbon contains deposits comprising one or more derivatives from triazine-based $H_2S$ scavengers, a dispersant to disperse the deposits in the hydrocarbon, where the dispersant comprises an effective amount of at least one organic carbonate; and
   mixing the dispersant into the hydrocarbon thereby dispersing the deposits in the hydrocarbon.

2. The method of claim 1 where the at least one organic carbonate is selected from the group consisting of ethylene carbonate, propylene carbonate, glycerol carbonate, styrene carbonate, dimethyl carbonate, diethyl carbonate, dibutyl carbonate, dodecyl carbonate, and combinations thereof.

3. The method of claim 1 where the effective amount of the at least one organic carbonate present in the hydrocarbon ranges from about 100 ppm to about 10 vol. %.

4. The method of claim 1 where the dispersant comprises the at least one organic carbonate in a quantity from about 25 to about 100 volume % of the dispersant.

5. The method of claim 1 where the dispersant further comprises at least one component selected from the group consisting of at least one solvent, at least one surfactant, at least one glycol ether, at least one organic acid, at least one ester, and combinations thereof.

6. The method of claim 1 where the dispersant further comprises at least one component selected from the group consisting of at least one solvent in a quantity of up to 25 volume % of the dispersant, at least one surfactant in a quantity of up to 10 volume % of the dispersant, at least one glycol ether in a quantity of up to 20 volume % of the dispersant, at least one organic acid in a quantity of up to 2 volume % of the dispersant, at least one ester in a quantity of up to 30 volume % of the dispersant, and combinations thereof.

7. The method of claim 1 further comprising heating the hydrocarbon after dispersant introduction at a temperature of between about 35° C. to about 250° C. for at least four hours.

8. A method for dispersing deposits in hydrocarbons, the method comprising:
   introducing into a hydrocarbon, where the hydrocarbon contains deposits comprising derivatives from triazine-based $H_2S$ scavengers, a dispersant to disperse the deposits in the hydrocarbon, where the dispersant comprises an effective amount of at least one organic carbonate, where the effective amount of the at least one organic carbonate ranges from about 100 ppm to about 10 vol. %, in the hydrocarbon, and where the organic carbonate is selected from the group consisting of ethylene carbonate, propylene carbonate, glycerol carbonate, styrene carbonate, dimethyl carbonate, diethyl carbonate, dibutyl carbonate, dodecyl carbonate, and combinations thereof; and
   mixing the dispersant into the hydrocarbon thereby dispersing the deposits in the hydrocarbon.

9. The method of claim 8 where the dispersant comprises the at least one organic carbonate in a quantity from about 25 to about 100 volume % of the dispersant.

10. The method of claim 8 where the dispersant further comprises at least one component selected from the group consisting of at least one solvent, at least one surfactant, at least one glycol ether, at least one organic acid, at least one ester, and combinations thereof.

11. The method of claim 8 where the dispersant further comprises at least one component selected from the group consisting of at least one solvent in a quantity of up to 25 volume % of the dispersant, at least one surfactant in a quantity of up to 10 volume % of the dispersant, at least one glycol ether in a quantity of up to 20 volume % of the dispersant, at least one organic acid in a quantity of up to 2 volume % of the dispersant, at least one ester in a quantity of up to 30 volume % of the dispersant, and combinations thereof.

12. The method of claim 8 further comprising heating the hydrocarbon after dispersant introduction at a temperature of between about 35° C. to about 250° C. for at least four hours.

13. A method for dispersing deposits in hydrocarbons, the method comprising:
   introducing into a hydrocarbon, where the hydrocarbon contains deposits comprising derivatives from triazine-based $H_2S$ scavengers, a dispersant to disperse the deposits in the hydrocarbon, where the dispersant comprises at least one organic carbonate in a quantity from about 25 to about 100 volume % of the dispersant, and where the dispersant comprises at least one component selected from the group consisting of at least one solvent, at least one surfactant, at least one glycol ether, at least one organic acid, at least one ester, and combinations thereof; and
   mixing the dispersant into the hydrocarbon thereby dispersing the deposits in the hydrocarbon.

14. The method of claim 13 where the at least one organic carbonate is selected from the group consisting of ethylene carbonate, propylene carbonate, glycerol carbonate, styrene carbonate, dimethyl carbonate, diethyl carbonate, dibutyl carbonate, dodecyl carbonate, and combinations thereof.

15. The method of claim 13 where the effective amount of the at least one organic carbonate present in the hydrocarbon ranges from about 100 ppm to about 10 vol. %.

16. The method of claim 13 where the dispersant further comprises at least one component selected from the group consisting of at least one solvent in a quantity of up to 25 volume % of the dispersant, at least one surfactant in a quantity of up to 10 volume % of the dispersant, at least one glycol ether in a quantity of up to 20 volume % of the dispersant, at least one organic acid in a quantity of up to 2 volume % of the dispersant, at least one ester in a quantity of up to 30 volume % of the dispersant, and combinations thereof.

17. The method of claim 13 further comprising heating the hydrocarbon after dispersant introduction at a temperature of between about 35° C. to about 250° C. for at least four hours.

* * * * *